United States Patent Office 3,562,262
Patented Feb. 9, 1971

3,562,262
TERTIARY AMINOPROPYL β-QUATERNARY 3,4,5-TRIMETHOXYBENZOATES
Kurt Schmidt, Zell, near Esslingen (Neckar), and Ernest Gunther, Eitorf (Sieg), Germany, assignors to Krewel Leuffen G.m.b.H. Arzneimittelfabrik, Eitorf, near Cologne, Germany
No Drawing. Continuation-in-part of application Ser. No. 384,516, July 22, 1964. This application Aug. 21, 1967, Ser. No. 661,789
Claims priority, application Germany, July 24, 1963, K 50,328
Int. Cl. C07d 87/36
U.S. Cl. 260—247.2      8 Claims

ABSTRACT OF THE DISCLOSURE

The specification discloses tertiary amino propyl β-quaternary esters of 3,4,5-trimethoxybenzoic acid that exhibit a high CNS damping effect, in the form of sedative, coronory blood vessel enlarging, blood pressure reducing, intestinal spasmolytic properties, and the respective therapeutic indices are excellent and toxicity low. The esters of the invention have the general formula:

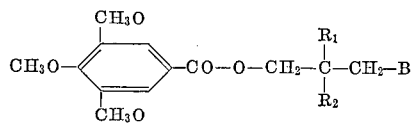

in which $R_1$ and $R_2$ represent alkyl (at least one of which is greater than methyl), aralkyl or aryl residues, and B represents a dialkyl amino residue, a saturated N-heterocyclic ring, or a morpholino group. $R_1$ and $R_2$ may represent, for instance, the following substitution pairs: methyl-propyl, ethyl-ethyl, ethyl-benzyl, and ethyl-phenyl. B may represent, for example, dimethyl amino, diethyl amino, pyrrolidino, piperidino or morpholino groups.

---

This application is a continuation-in-part of copending application Ser. No. 384,516 filed July 22, 1964, now abandoned.

FIELD

This invention relates to tertiary amino propyl ester derivatives of 3,4,5-trimethoxybenzoic acid having, inter alia, a quaternary carbon in the ester group, that exhibit a high CNS damping effect, in the form of sedative, coronary blood vessel enlarging, blood pressure reducing, and intestinal spasmolytic properties. The respective therapeutic indices are excellent, while at the same time the toxicity is lower as compared to prior art compounds. The compounds of this invention which have sedative properties, e.g., as measured by prolonging hexobarbital-type sleep, at lower dosages and/or with lower toxicity, as compared to prior art compounds of the class, self-evidently have pharmaceutical utility. Improvements in such properties are exemplary of the increased pharmaceutical efficiency of the compounds of this invention.

BACKGROUND AND PRIOR ART

Modern scientific literature has made familiar numerous 3,4,5-trimethoxybenzoic acid derivatives that have neuro-pharmacological action of the CNS-depressive type. Typical of amide derivatives which exhibit intensified hexobarbital sleep at lower dosages and with less toxicity than prior art compounds are those disclosed in copending application Ser. No. 321,329, filed Nov. 4, 1963, now U.S. Pat. No. 3,330,866.

In the ester class, base substituted alkyl esters also are known to have a depressive effect on the central nervous system. Typical prior art esters, however, have unbranched alkyl chains.

Although the compounds of the present invention are not in the structural class of reserpine analogs, it is significant to mention some of the prior art in the area of reserpine analogs since the art has tended to seek toward, and the present compounds have obtained, at least one aspect of reserpine-like activity, particularly that of the tranquilizing activity. Miller and Weinberg, in Chem. and Engineering News, vol. 34, page 4760 (Oct. 1, 1956), reported that the tertiary N-N-diethylamino propyl ester trimethoxybenzoic acid has a "tranquilizing activity" equivalent to "one third of that of reserpine." They also reported that the corresponding primary amino propyl ester is inactive, as is the tertiary amino ethyl ester. They reported that the oxygen and nitrogen must be separated by three carbons and the nitrogen atom must be tertiary.

Lunsford et al., in J. Org. Chem., vol. 22, pp. 1225–1228 (1957), examined several derivatives of the 4-dialkylamino-1-butanols for pharmacological activity. It was reported that the trimethoxybenzoate derivatives were devoid of any reserpine-like activity as indicated by their failure to prolong the hexobarbital sleeping time in mice and their failure to effect the fall-off time of rats from a rotating rod. According to this report, both the tertiary dimethyl amino butyl and the tertiary ethyl-methyl amino butyl derivatives of 3,4,5-trimethoxybenzoic acid have no activity. Similarly, Sastry et al. prepared 4-(N,N-diethyl amino)-butyl-3,4,5-trimethoxybenzoate, as reported in J. Org. Chem., vol. 23, pp. 1577–1578 (1958). Although it was anticipated that the incorporation of four instead of three carbon atoms between the tertiary nitrogen and the ether oxygen of the ester linkage would yield a moiety resembling reserpine more closely in its properties than that reported by Miller and Weinberg, the pharmacological evaluation of the compounds was not reported by Sastry in that communication, and the lower homologs prepared by Lunsford et al. showed no activity.

Subsequently, in an article by Lindner et al. in J. Med. Chem., vol. 6, pp. 97–101 (1963), certain derivatives of 3,4,5-trimethoxybenzoic acid esters and certain reserpine analogs were prepared, including the compound of Sastry et al. The Sastry compound (compound 48 of Lindner et al.) indicated an extremely slight, essentially unappreciable, effect with respect to anti-spasmodic and adrenalitic activity. The results reported by Lindner et al. indicate that departure from tertiary phenyl ethyl amine structure leads to clearly diminished depressant activity. For the tertiary phenyl ethyl amine, $C_6H_5(CH_2)_2N(C_2H_5)$, the increase in the alkyl ester chain from $C_2$ to $C_6$ shows a marked decrease in depressant activity as measured by the A.D.C. while on the other hand the anti-spasmodic and adrenalitic activity increases somewhat, although the spasmolitic activity against evoked submaximum contractions with carbamylcholine did not exhibit consistent results, varying from 1, to 13, to 4, to 30 for $C_2$, $C_3$, $C_4$, and $C_6$, respectively. With respect to the alkyl ester chain, the Lindner et al. analogs corresponded to the opening of reserpine rings D, or E, or both rings.

Still subsequent work by Vazakas et al. in J. of Pharm. Sci., vol. 53, pp. 165–168 (1964), further illustrates that certain structural analogs of reserpine do not exhibit reserpine-type effects. Vazakas et al. confirm that the 4-(N,N-dimethyl amino), -diethyl amino), and -di-isopropyl amino)-butyl-3,4,5-trimethoxybenzoate esters do not exhibit reserpine-type activity. Similarly the 4-(4-substituted piperazino)butyl-3,4,5-trimethoxy - benzoates possessing portion of reserpine rings C, D and E were also ineffective. Attesting the lack of analogous activity, although the above-mentioned compounds did not significantly effect the blood pressure of anesthetized normo-tensive dogs, they did exhibit a local anesthetic action, which is systematically different than reserpine-type activity.

Keeping in mind the important distinction between structural analogs of reserpine and activity analogous to that of reserpine (reserpine-type aor reserpine-like activity) the closest approach to the compounds of this invention in the prior art is represented by the article of Palazzo et al. in Annali Di Chemica, vol. 49, pages 853–868, (May–June 1959), parallel reference, Chem. Abstracts, vol. 54, page 24510 (1960). With regard to the substituted amino propyl esters of 3,4,5-trimethoxybenzoic acid, Palazzo et al. prepared the unbranched 3-diethyl amino propyl ester (Palazzo et al. compound IV), the 3-piperidine propyl ester (Palazzo et al. compound X), the 3-morpholino propyl ester (Palazzo et al. compound XI). With respect to branched chain compounds, Palazzo et al. prepared 2,2-dimethyl-3-diethyl amino propyl ester (Palazzo et al. compound XIV). In addition, Frangatos et al., in Canadian J. Chem., vol 38, pages 1082–1086 (1960), parallel reference Chem. Abstracts, vol. 55, page 26850, prepared the 3-pyrrolidinopropyl ester of 3,4,5-trimethoxybenzoic acid.

The compound XIV of Palazzo et al. is the lower homolog of one of the compounds of this invention, but surprisingly we have found that as compared to that lower homolog which exhibits no therapeutic effects of the type involved here, the compounds of this invention, including the higher homolog, exhibit a considerably lower toxicity and unexpectedly superior effects on the central nervous system as compared to known unbranched, basically substituted alkyl esters of 3,4,5-trimethoxybenzoic acid. Not only were no effects given by Palazzo et al. for the β-dimethyl substituted propyl ester, but as disclosed in greater detail herein, a rerun of that Palazzo et al. compound XIV confirms that the compound does not have the pharmacological properties of the higher homologs and other compounds of this invention. Although a patent to Matsui, Japanese Pat. 37–226 (1962), parallel reference Chem. Abstracts, vol. 58, page 482a (1963), indicates that the α-methyl and α-ethyl diethylamino propyl trimethoxybenzoates are useful as tranquilizers, it was entirely unexpected aht a β-quaternary tertiary amino propyl trimethoxybenzoate having radicals higher than methyl on the quaternary carbon atom of the propyl chain would exhibit useful pharmacological properties, in view of the disclosure of Palazzo et al. that the corresponding methyl lower homolog has no such properties. This is particularly the case since the Matsui α-methyl derivative corresponds to the Palazzo et al. compound XVI.

THE INVENTION

We have discovered that basic 3,4,5-trimethoxybenzoic acid esters, characterized as tertiary amino propyl β-quaternary 3,4,5-trimethoxybenzoates having the general formula:

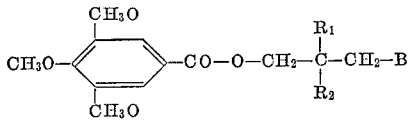

in which $R_1$ and $R_2$ represent alkyl (at least one of which is greater than methyl), aralkyl or aryl residues, and B represents a dialkyl amino residue, a saturated N-heterocyclic ring, or a morpholino group, have marked pharmacological properties which lend them to pharmaceutical utility. The compounds of this invention are prepared by a conventional process from 3,4,5-trimethoxybenzoyl chloride reacted with highly complex 3-amino propanols having the general formula:

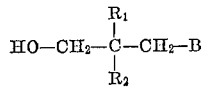

in which $R_1$, $R_2$ and B have the same significance as given above.

The compounds of this invention exhibit a high central nervous system damping effect as expressed by the sedative properties, coronary blood vessel enlarging property, blood pressure reducing effect, intestinal spasmolitic efficiency, and have good therapeutic indices for each of those properties. As compared to presently known basically substituted unbranched alkyl esters of 3,4,5-trimethoxybenzoic acid, the compounds of the present invention have considerably lower toxicity and unexpectedly superior effects on the central nervous system in the above-listed properties. With respect to the lower homolog, the β-dimethyl propyl ester which has no sedative effect, the properties of the compounds of the present invention are even more unexpected.

$R_1$ and $R_2$ may represent, for instance, the following substitution pairs: methyl-propyl, ethyl-ethyl, ethyl-benzyl and ethyl-phenyl. B may represent, for example, dimethyl amino, diethyl amino, pyrrolidino, piperidino or morpholino groups. These new compounds are produced by conventional methods, by the conversion of trimethoxybenzoyl chloride with the amino propanols already mentioned, in a two-phase reaction mixture or in an inert solvent, in conjunction with an aqueous alkali or tertiary organic basis.

The following examples will serve to illustrate the invention:

EXAMPLE 1

3,4,5-trimethoxybenzoic acid(2,2-diethyl-3-diethyl-amino-propyl-1)ester

A quantity of 28 grams of 2,2-diethyl-3-diethyl-aminopropanol-1 and 6 grams of NaOH dissolved in 80 milliliters of water are placed in a 1-liter three-necked flask. Then 34.5 grams of 3,4,5-trimethoxybenzoic acid chloride, dissolved in 200 milliliters of absolute benzene, is dripped in, ice cooling being used. Next, the reaction mixture is boiled for two hours, with reflux. After cooling, the benzene phase is separated from the aqueous phase. The aqueous phase is shaken out several times with benzene. The benzene phases are added together, shaken out 3 times with 50 milliliters of 15% NaOH each time, and then washed neutral with water, dried with $Na_2SO_4$ and reduced. The residue is distilled in high vacuum. Yield: 40 grams=70% of theoretical. $n_D^{25}$=1.5103.

EXAMPLE 2

3,4,5-trimethoxybenzoic acid(2,2-diethyl-3-piperidine-propyl)ester

A quantity of 30 grams of 2,2-diethyl-3-piperidine-propanol-1 and 6 grams of NaOH dissolved in 80 milliliters of water are placed in a 500 milliliter three-necked flask. Then 34.5 grams (0.15 mol) of trimethoxybenzoic acid chloride dissolved in 200 milliliters of absolute ether is dripped in, ice cooling being used. On completion of the addition, the ice bath is removed and the reaction mixture boiled for 2½ hours, with reflux. Then the ether phase is separated from the aqueous phase. The aqueous phase is shaken out several times with ether. The ether phases are added together, shaken out 3 times with 50 milliliters of 15% NaOH each time, washed neutral with water, dried with $Na_2SO_4$ and reduced. The solid residue is absorbed with methanol and is boiled off with active carbon, filtered out and again crystallized out in the ice-box. Yield: 18.5 grams=32.5% of theoretical.

EXAMPLE 3

3,4,5-trimethoxybenzoic acid (2,2-diethyl-3-pyrrolidine-propyl) ester

A quantity of 27.8 grams of 2,2-diethyl-3-pyrrolidine-propanol-1 and 6 grams of NaOH dissolved in 80 milliliters of water are placed in a 500 milliliter three-necked flask. Then 34.5 grams (0.15 mol.) of trimethoxybenzoic acid chloride dissolved in absolute benzene is dripped in, ice cooling being used. On completion of the addition, the reaction mixture is boiled for a further 2 hours, with reflux. Next, the benzene phase is separated from the aqueous phase. The aqueous phase is shaken out several times with benzene. The benzene phases are add together, shaken out 3 times with 50 milliliters of 15% NaOH each time, then washed neutral with water, dried with $Na_2SO_4$ and reduced. The residue is absorbed with alcohol and boiled off with active carbon. To obtain an analytically pure substance, this purifying process must be repeated two or three times. Yield: 22.5 grams=39.5% of theoretical.

EXAMPLE 4

3,4,5-trimethoxybenzoic acid (2-phenyl-2-ethyl-3-piperidine-propyl) ester

A solution of 24.7 grams of 2-phenyl-2-ethyl-3-piperidine-propanol-1 and 10.1 grams of triethylamine in 100 milliliters of dehydrated benzene is prepared. A solution of 23 grams of 3,4,5-trimethoxybenzoyl chloride in 100 milliliters of benzene is dripped into the ice-cooled reaction mixture, arrangements being made for agitation and the exclusion of moisture. The ice cooling is then removed and heat is applied 30 minutes later, for one hour, on a steam bath.

The cooled reaction mixture is shaken out, in succession, with dilute NaOH and with water. The separated benzene phase is dried over sodium sulphate. After removal of the benzene by distillation, the residue crystallizes upon cooling. Yield: 14 grams=32% of theoretical, colorless crystals of M.P. 74°–75°.

EXAMPLE 5

3,4,5-trimethoxybenzoic acid-(2,2-diethyl-3-morpholino-propyl)ester 30.2 grams of 2,2-diethyl-3-morpholinopropanol-1 and 16 grams of triethylamine are dissolved in 200 ml. of dried chloroform. Into the ice-cooled mixture is added drop by drop a solution of 35 grams of 3,4,5-trimethoxybenzoic acid chloride in 100 ml. of dried chloroform. The further processing is carried out analogously to the manner described in Example 4. Yield: 35 grams=59% of theoretical, colorless crystals of M.P. 56° C. from ether-petroleum ether.

EXAMPLE 6

Analogously to the procedure described in Example 4, 36 grams of 2-ethyl-2-benzyl-3-diethylamino-propanol-1 are reacted with 35 grams of 3,4,5-trimethoxybenzoyl chloride under addition of 15 grams of triethylamine, in which process there is obtained 3,4,5-trimethoxybenzoic acid-(2-benzyl-2-ethyl-3-diethylamino propyl)-ester Yield: 35 grams=55% of theoretical, liquid of boiling point 0.2 mm. Hg 210° C., $n_D^{25}$=1.5406.

EXAMPLE 7

As described in Example 4, there is obtained by reaction of 46 grams 2-ethyl-2-phenyl-3-pyrrolidinopropanol-1 with 46 grams 3,4,5-trimethoxybenzoyl chloride and 27 g. triethylamine, 3,4,5-trimethoxybenzoic acid-(2-ethyl-2-phenyl-3-pyrrolidino-propyl) ester. Yield: 54% of theoretical, liquid of B.P. 0.01 mm. Hg 204° C., $n_D^{25}$=1.5530.

In the following table, the compounds of Examples 1–7 were compared with the straight chain and branched compounds found in the prior art with respect to toxicity, sedative effect, and the corresponding therapeutic index. In the tables, the letters A–E signify comparison substances known from the previously discussed literature, namely:

A=3,4,5 - trimethoxybenzoic acid - (3 - diethyl amino propyl) ester; Palazzo et al. compound IV;

B=3,4,5-trimethoxybenzoic acid-(3-piperidino propyl) ester; Palazzo et al. compound X;

C=3,4,5-trimethoxybenzoic acid-(3-pyrrolidinopropyl) ester; Frangatos et al. compound;

D=3,4,5-trimethyloxybenzoic acid-(3-morpholino proply) ester; Palazzo et al. compound XI;

E=3,4,5 - trimethoxybenzoic acid - (2,2 - dimethyl - 3 - diethy amino propyl) ester; Palazzo compound XIV, the lower homolog of one of the compounds of the present invention (Example 1).

The acute toxicity is indicated in Table 1 as the $LD_{50}$ in mg./kg. This is the amount of the compound which after subcutaneous administration causes the death of 50% of the experimental animals (white mice) within 24 hours.

For the determination of the sedative effectiveness, the percentile extension of the hexobarbital sleep was ascertained by the method of Holten and Larsen in Acta Pharmakoligica et Toxicologica, 12, 1959, pages 346–363. Hexobarbital refers to the international brief designation for 5-(cyclohexene-1-yl)-5-methyl-N-methyl barbituric acid. According to the Holten and Larsen method, the test substances were administered in the doses of 1%, 2%, and 5% of the $LD_{50}$ in each case 30 minutes before the subcutaneous application of 100 mg./kg. of hexobarbital sodium, and the sleep extension was measured with respect to creatures not pretreated. The results were graphically plotted to give a dose-effect curve and the $ED_{50}$ was graphically determined with the aid of the curve. The $ED_{50}$ is the effective dose which causes a 50% extension of sleep.

The therapeutic index is simply ascertained by dividing the $LD_{50}$ value by the value for the $ED_{50}$; since both units are in mg./kg. the index is a unitless ratio, the higher the value of which shows a greater therapeutic effectiveness and utility insofar as it indicates a relatively low dosage amount for $LD_{50}$, acute toxicity.

TABLE 1

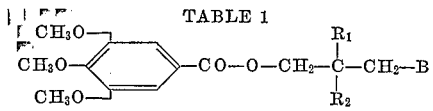

| Compound | $R_1$ | $R_2$ | B | Acute toxicity $LD_{50}$, mg./kg. | Sedative effectiveness $ED_{50}$, mg./kg. | Therapeutic index |
|---|---|---|---|---|---|---|
| Example 1 | $C_2H_5$ | $C_2H_5$ | N(C$_2$H$_5$)(C$_2$H$_5$) | 3,360 | 29.57 | 114 |
| A=IV | H | H | Same | 250 | (¹) | |
| Example 2 | $C_2H_5$ | $C_2H_5$ | N(morpholino) | 4,500 | 101.25 | 44.4 |
| B=X | H | H | Same | 175 | (¹) | |
| Example 3 | $C_2H_5$ | $C_2H_5$ | N(pyrrolidino) | 2,125 | 20.19 | 105 |
| C | H | H | Same | 225 | (¹) | |

See footnote at end of table.

TABLE 1—Continued

| Compound | $R_1$ | $R_2$ | B | Acute toxicity $LD_{50}$, mg./kg. | Sedative effectiveness $ED_{50}$, mg./kg. | Therapeutic index |
|---|---|---|---|---|---|---|
| Example 4 | $C_2H_5$ | $C_6H_5$ | N⟨⟩ | (²) | 172.5 | >35 |
| B=X | H | H | Same | 175 | (¹) | -------- |
| Example 5 | $C_2H_5$ | $C_2H_5$ | N⟨O⟩ | 1,880 | 15.98 | 117.6 |
| D=XI | H | H | Same | 1,080 | 40.5 | 26.7 |
| Example 6 | $C_2H_5$ | $C_6H_5 \cdot CH_2$ | N(C_2H_5)(C_2H_5) | 4,280 | 59.92 | 71.4 |
| A=IV | H | H | Same | 250 | (¹) | -------- |
| Example 7 | $C_2H_5$ | $C_6H_5$ | N⟨☐⟩ | 2,200 | 29.7 | 74 |
| C | H | H | Same | 225 | (¹) | -------- |
| Example 1 | $C_2H_5$ | $C_2H_5$ | N(C_2H_5)(C_2H_5) | 3,360 | 29.57 | 114 |
| E=XIV | $CH_3$ | $CH_3$ | Same | 850 | (¹) | -------- |

¹ Not achieved.
² Not achieved up to 6,000.

A review of Table 1 indicates that in the case of compounds A, B, C and E a sedative effect was not achieved; that is, no effective dose which causes a 50% extension of sleep was achieved, and thus the therapeutic index was not calculable. With regard to the prior art compound D, which is Palazzo compound XI, not only is the $LD_{50}$ dosage amount significantly lower than the comparison compound Example 5, but the $ED_{50}$ is also almost 3 times greater. Thus the therapeutic index is on the order of 4½ times lower than that for the compound of Example 5. In all cases of the compounds of this invention, the acute toxicity in terms of mg./kg. dosage is significantly higher than the comparison compounds. In the case of the compound of Example 4, the death of 50% of the experimental animals in 24 hours was not achieved even up to a dosage of 6,000 mg./kg. The test results obtained herein for compound E, Palazzo et al. compound XIV, agree well with the results reported by Palazzo et al. insofar as they reported acute toxicity at as low as 250 mg./kg., but reported no values for either the percentile extension of the pentobarbital narcosis (the international brief designation for 5-ethyl-5-(1-methyl butyl)-hexahydropyrimidine-2,4,6-trione), or for the mg./kg. of compound producing a given percentile sleep extension.

In addition to the above data, the coronary vessel dilating effectiveness was determined on the isolated guinea pig heart according to the method of Langendorff, as described by L. Ther in Pharmakologische Methoden (Pharmacological Methods), (1949), pages 170–174. By this method the $ED_{50}$ (the effective dose which brings about a 50% increase in coronary flow) was graphically determined from the dose-effect curve, in a manner similar to that of determination of the sedative effectiveness $ED_{50}$. The therapeutic index for coronary vessel dilating effectivenesss was also calculable by dividing the $LD_{50}$ by the coronary flow increase $ED_{50}$. For the compounds given in the first subsection of Table 1, the compound of Example 1 as compared to the prior art compound A, the respective values for the $ED_{50}$ were 30 gamma and 1.8 mg., while the therapeutic index values were 112,000 as compared to 138. For the compound of Example 3 as compared to the prior art compound C the values for $ED_{50}$ were 56 gamma as compared to 3.6 mg., while the therapeutic index was 37,946 compared to 62. For the compound of Example 4 as compared to the prior art compound B, the $ED_{50}$ is 150 gamma whereas the $ED_{50}$ value was not achieved for compound B (Palazzo's compound X). The therapeutic index for the compound of Example 4 is at least >40 whereas that for the compound B is not calculable. For the compound of Example 6 as compared to that of compound A, the $ED_{50}$ is 95 gamma as compared to 1.8 mg. and the therapeutic index is 45,052 as compared to 138.

Blood pressure measurement comparisons were also carried out as follows. The blood pressure was determined on rabbits narcotized (anesthetized) with urethane (1 g./kg., 25% solution, intravenous) on the Arteria carotis communis by means of mercury monometer. The compounds to be tested were injected intravenously into the Vena jugularis externa, as described in L. Ther, Pharmakologische Methoden (1949), pages 212–227. The $ED_{50}$ (effective dose which causes a 50% lowering of blood pressure) was graphically determined from the dose-effect curve, as above, and the therapeutic index calculated. The results for the Examples 1–3 and 5–7 as compared to compounds A–D are reported in Table 2 below.

TABLE 2

| | $LD_{50}$, mg./kg. | Blood pressure, $ED_{50}$ mg./kg. | Lowering effectiveness therapeutic index |
|---|---|---|---|
| Compound: | | | |
| Example 1 | 3,360 | 2 | 1,680 |
| A=IV | 250 | 3.1 | 80 |
| Example 2 | 4,500 | 5.4 | 833 |
| B=X | 175 | 3.9 | 45 |
| Example 3 | 2,125 | 1.95 | 1,089 |
| C | 225 | 6.5 | 34 |
| Example 5 | 1,880 | 2.6 | 723 |
| D=XI | 1,080 | 4.75 | 227 |
| Example 6 | 4,280 | 2.6 | 1,646 |
| A=IV | 250 | 3.1 | 80 |
| Example 7 | 2,200 | 3.0 | 733 |
| C | 225 | 6.5 | 34 |

As can be seen in all cases, the therapeutic index is vastly increased over that of the prior art compounds.

Intestinal spasmolitic effect was also determined by the method of R. Magnus as described in L. Ther, Pharmakologische Methoden (1949), pages 288–290, on the isolated guinea pig intestine. The $ED_{50}$ (the effective dose which brings about a 50% spasmolysis) was graphically determined from the dose-effect curve, and the corresponding therapeutic index was calculated. The acetyl choline spasm was evoked by 2.5 gamma of acetyl choline per 50 ml. bath, and the histamine spasm by 4 gamma of histamine per 50 ml. of bath. For the compound of Example 3 as compared to the compound C, the $ED_{50}$ was 150 gamma as compared to 175 gamma and the therapeutic index is 14,168 as compared to 1,285 for the acetyl choline spasm. For the same compounds, the histamine spasm values are, for the $ED_{50}$, 90 gamma as compared to 115 gamma, and the therapeutic index is 23,611 as compared to 1,956. For the compound of Example 7 as compared to compound C, the values for acetyl choline spasm are, for $ED_{50}$, 820 gamma as against 175 gamma with the corresponding therapeutic indices being 2,683 compared to 1,285.

We claim:

1. A basic tertiary amino propyl $\beta$-quaternary 3,4,5-trimethoxybenzoic acid ester selected from the group having the formula:

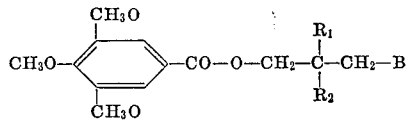

in which $R_1$ and $R_2$ are selected from ethyl-propyl, ethyl-ethyl, ethyl-benzyl, or ethyl-phenyl, and B is selected from dimethyl amino, diethyl amino, pyrrolidino, piperidino or morpholino.

2. A compound of claim 1 in which $R_1$ and $R_2$ are ethyl groups, and B is diethyl amino.

3. A compound of claim 1 in which $R_1$ and $R_2$ are ethyl groups and B is piperidino.

4. A compound of claim 1 in which $R_1$ and $R_2$ are ethyl groups and B is pyrrolidino.

5. A compound of claim 1 in which $R_1$ is phenyl, $R_2$ is ethyl, and B is piperidino.

6. A compound of claim 1 in which $R_1$ and $R_2$ are ethyl groups, and B is morpholino.

7. A compound of claim 1 in which $R_1$ is ethyl, $R_2$ is benzyl, and B is diethyl amino.

8. A compound of claim 1 in which $R_1$ is ethyl, $R_2$ is phenyl, and B is pyrrolidino.

References Cited

FOREIGN PATENTS 1,344,455    10/1963    France.

ALEX MAZEL, Primary Examiner

J. TOVAR, Assistant Examiner

U.S. Cl. X.R.

260—294.3, 326.3, 473; 424—248